May 26, 1970 A. A. DE MEO 3,514,548

TELEPHONE APPARATUS FOR DISCRIMINATING BETWEEN DESIRED AND UNDESIRED CALLS

Filed April 12, 1967

INVENTOR.
ATTILIO A. DEMEO

BY Herbert Smith Sylvester

ATTORNEY

United States Patent Office 3,514,548

Patented May 26, 1970

3,514,548

TELEPHONE APPARATUS FOR DISCRIMINATING BETWEEN DESIRED AND UNDESIRED CALLS

Attilio A. De Meo, Brooklyn, N.Y., assignor to Priva-Phone, Inc., Brooklyn, N.Y., a corporation of New York Filed Apr. 12, 1967, Ser. No. 630,269
Int. Cl. H04m *1/66*
U.S. Cl. 179—84 7 Claims

ABSTRACT OF THE DISCLOSURE

An apparatus is disclosed which enables a telephone to discriminate between desired and undesired incoming calls and to accept or be actuated by only those calls which employ a predetermined supplemental signalling code.

Figures 1, 2:
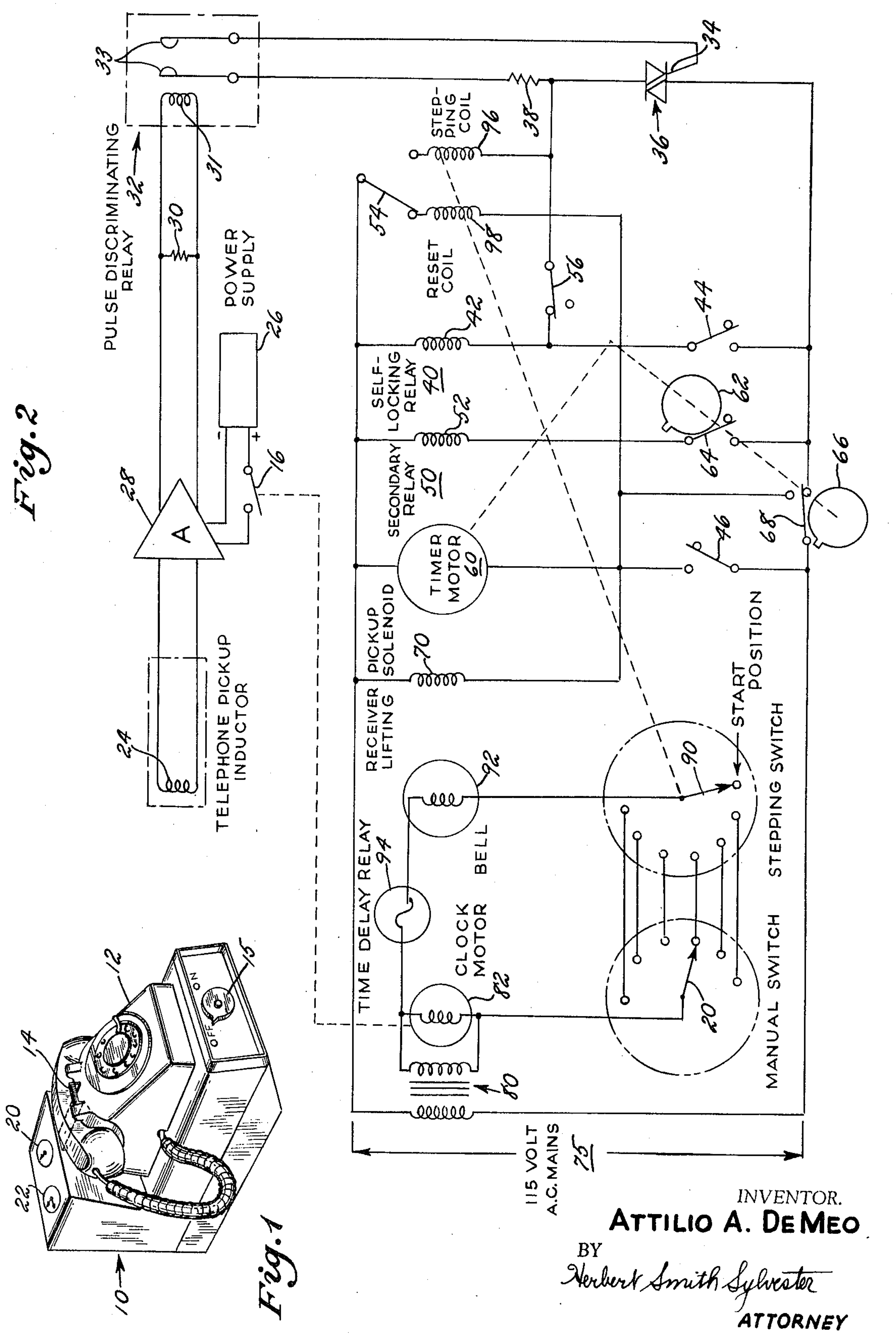

This invention relates to telephone apparatus. More particularly, it relates to a telephone apparatus which discriminates between desired and undesired incoming calls and to accept or be actuated only by those calls which embody a predetermined supplemental signalling code. This apparatus suitably may take the form of a telephone privacy device which permits conversion of a standard telephone to a private telephone at will. In its preferred embodiment, the instant device does not in any way modify any part of a standard telephone, and it may be used with a standard telephone without having to disturb externally or internally any part of that standard telephone. Alternatively, the instant device may suitably be incorporated in a telephone as an integral part thereof.

The instant apparatus permits normal usage of a standard telephone; however when the instant apparatus is in use, and an incoming call is received, the apparatus will cause the duration of the ringing of the bell of the standard receiver to be eliminated or to be of an extremely short, virtually unnoticeable duration. Thus, the call will not be announced in any definite way unless the caller dials an appropriate supplemental code number in a timely manner. If the party calling is not informed of the use of the instant apparatus or does not dial the appropriate supplemental code number within an appropriate time interval, his call, although initially completed, will be terminated automatically at the receiver.

On the other hand, if the party calling dials the appropriate supplemental code number in a timely manner, an annunciator located in the instant apparatus will announce the incoming call and the standard receiver may be used in the customary manner. On the other hand, if no one is in attendance, the receiver will be lifted off the cradle and the annunciator will call for some preset time, after which the receiver automatically will be replaced on its cradle.

The instant device has no effect whatsoever with respect to outgoing calls which may be initiated in the normal manner. Moreover, it may be used with conventional dialing systems, tone systems, and the like.

It will be seen, then, that the instant device permits its user to add his own, supplemental code to his normal telephone number so as to prevent unauthorized or undesired calls. This device may be used or deactuated at any time subject to the wishes of its user, thus permitting normal receiver operation during certain hours and private telephone operation at other times.

The invention will be further described in conjunction with the accompanying drawings which are to be considered as exemplary of a preferred embodiment of the invention and which do not constitute limitation thereof.

In the drawings:

FIG. 1 is a view in perspective of a standard telephone in place on an embodiment of the instant invention; and FIG. 2 is a schematic representation of the electrical circuit contained within the apparatus of FIG. 1.

The apparatus of FIGS. 1 and 2 includes a housing 10 on which a standard telephone 12 is disposed. A receiver pick-up arm 14 extends from the housing 10 under the receiver of the standard telephone 12. In the normal position illustrated, the pick-up arm 14 is below the lower surface of the receiver and has no effect thereon. A manual actuator 15 for On-Off switch 16 (see FIG. 2) is disposed on the front of the housing 10, and a manual selector switch 20 and a clock timer 22 for automatic operation of the On-Off switch 16 are disposed on the top surface of the housing 10. (The disposition of the selector switch 20 in a prominently exposed location is not required. It may also suitably be hidden and not readily accessible.)

Within the housing 10 are disposed the elements of FIG. 2 which includes a telephone pick-up inductor 24 which is disposed within the housing 10 in proximity to the ringing coil of the standard telephone (not shown). Also disposed within the housing 10 are the On-Off switch 16, which controls the supply of power from a D.C. power supply 26 to an amplifier 28 for signals received by the telephone pick-up inductor 24. The output of the amplifier 28 is transmitted across a damping resistor 30 to the coil 31 of a a pulse discriminating relay 32 having normally open contacts 33. (This relay is pulse actuated, and is normally insensitive to voice signals).

The contacts 33 of the pulse discriminating relay 32 form part of the gate circuit 34 of a three-terminal semiconductor switch for A.C. power 36 and an isolating resistor 38.

The balance of the circuit includes a self-locking relay 40 having a coil 42, self-locking contacts 44, and a second set of contacts 46; a secondary relay 50 having a coil 52 and two pairs of contacts 54 and 56 actuated thereby. All relay contacts are shown in their normal, de-energized position.

The circuit of FIG. 2 also includes a timer motor 60 which operates two cam operated switches, the first cam 62 actuating a normally open switch 64 and the second cam 66 actuating a single pole double throw switch 68.

In parallel with the timer motor 60 is a receiver pick-up lifting solenoid 70 which operates the receiver pick-up arm 14 of FIG. 1.

The instant apparatus is powered from 115-volt A.C. mains 75, and a transformer 80 provides a reduced voltage input for the motor 82 of the clock timer 22 of FIG. 1 as well as for a series circuit constituted by the multi-position manual switch 20, a stepping switch 90, a bell 92, and a time delay relay 94. As illustrated in FIG. 2, the stepping switch 90 is coupled to a stepping coil 96 and a reset coil 98.

In use, when the On-Off switch 16 is thrown to the Off position illustrated, either manually by the actuator 15 or automatically by the clock timer 22, the instant apparatus is entirely inoperative and the standard telephone 12 is used in the conventional manner.

When the On-Off switch 16 is moved to the On position, either manually by the actuator 15 or by the clock timer 22, the instant apparatus becomes operative. In this case outgoing calls are made in the conventional manner and the device functions only with respect to incoming calls.

When an incoming call enters the standard telephone 12, the telephone pick-up inductor 24 senses the flux build-up in the bell coil of the standard telephone. The induced voltage in the pick-up inductor 24 is amplified by the amplifier 28 and actuates the pulse discriminating relay 32.

On actuation of the pulse discriminating relay 32, its contacts 33 close, causing the semi-conductor switch 36 to become conductive. This in turn energizes the self-locking relay 40, which is self-locking by virtue of its contacts 44 which are in series with its coil 42 across the 115-volt A.C. mains 75.

Closing of the second set of contacts 46 of the self-locking relay 40 causes the receiver pick-up lifting solenoid 70 and the timer motor 60 to be energized. The lifting solenoid 70 elevates the receiver pick-up arm 14, thus completing the incoming call.

The timer motor 60 drives two cams, one of which closes the normally open switch 64 at a pre-set time interval, e.g., one second, after the timer motor 60 starts. Closing of the switch 64 energizes the coil 52 of the secondary relay 50. Energization of the secondary relay 50 moves its relay contact 54 so as to connect the stepping coil 96 to the 115-volt A.C. mains through the three-terminal semi-conductor switch 36. At the same time, the other, normally closed contacts 56 on the secondary relay 50 are opened.

The foregoing condition is obtained as a result of the secondary relay 50 being energized, under which circumstance the apparatus is ready to receive the appropriate coded input pulses which must be supplied by dialing of the transmitting telephone.

As stated previously, for a call to be completed under these circumstances it is necessary for the calling party to transmit the correct code. When the originating telephone is so operated, the telephone pick-up inductor 24 will receive the transmitted signal entering the standard telephone 12 and these signals will be amplified by the amplifier 28 and actuate the pulse discriminating relay 32, which in turn will trigger the semi-conductor switch 36 and energize the stepping coil 96. Each transmitted signal received advances the stepping switch 90. When the stepping switch 90 is aligned electrically with the manual switch 20, which has previously been set to the code desired, power will be applied from the secondary of the transformer 80 through the time delay relay 94 to the bell 92 of the apparatus. The time delay relay 94 delays ringing of the bell 92 for a desired period, typically of from five to ten seconds, so as to preclude ringing should the caller attempt to determine the appropriate code by trial and error. Thus, if the switch 90 does not remain in the coded position, e.g., as the result of additional transmitted signals being received from one who does not possess the correct code, annunciation will not occur.

If the correct code is transmitted so as to align electrically the stepping switch 90 and the manual switch 20, the bell 92 will ring after the time delay relay 94 closes, indicating that the party making the call is using the proper code and therefore is a desired caller.

In the event that the party initiating the incoming call is not aware of or does not transmit the proper code after the call is initially completed as the result of elevation of the receiver pick-up arm 14, the call continues temporarily to remain completed without any significant annunciation thereof, that is without in any way disturbing the user of the instant apparatus. After the timer motor 60 has operated for a suitable period of time, typically on the order of one minute and 50 seconds, it causes cam 66 to actuate switch 68 from the position illustrated in FIG. 2 to its alternative position, in which case power is supplied to the stepping switch re-set coil 98 and power is removed from the coil 42 of the self-locking relay 40, from the relay 50, and from the stepping coil 96. This application of power to the re-set coil 98 causes the stepping switch 90 to be repositioned to the start position illustrated in FIG. 2.

The timer motor 60 completes its cycle a short time thereafter, e.g., suitably ten seconds later, when its second cam 66 releases the switch contact 68 and permits it to return to the normal position illustrated in FIG. 2. At this time the lifting solenoid 70 is de-energized and the receiver pick-up arm returned to its normal lower position, thus returning the standard telephone 12 to its normal condition to await further use.

It should be apparent that in the event a welcome call is received and the bell 92 rings, substantially the sequence of the two preceding paragraphs is otherwise followed. Once the receiver pick-up arm 14 has been lifted manually and is in use, completion of the foregoing two-minute cycle is immaterial and, when the call is completed and the receiver pick-up arm replaced manually, the telephone 12 is immediately ready for further use. It should also be mentioned that ringing of the bell 92 may be stopped simply by actuating the handset switch of the standard telephone 12, which will disconnect the bell circuit of the instant apparatus (by moving the stepping switch 98).

If the alternative situation in which On-Off switch 16 has been set to the On position, either manually or by appropriate action of the clock timer 22, and no one is in attendance, the receiver pick-up arm 14 will be lifted off the cradle in the manner described. If the proper code number has been transmitted, the bell 92 will ring for the predetermined time interval, e.g., approximately two minutes, and then the receiver will be automatically replaced on the standard telephone 12.

Although the preceding embodiment is preferred by virtue of the fact that it may be used without internal modification of a standard telephone, it will be realized that similar results may be obtained by connecting the pulse discriminating relay directly across the telephone lines, either through coupling it in by means of standard plugs and jacks, or by physically wiring it into the telephone itself. In the latter case, the annunciator of the standard telephone may be also used as part of the instant apparatus.

The instant apparatus has been described with respect to one particular application, i.e. the rejection of calls made by parties uniformed as to the requisite supplemental transmitting code. However, numerous other possible applications of the instant device are possible. For example, by means of the use of appropriate supplemental transmitting codes, the owner of the standard telephone can call from remote locations and cause illumination to be turned On or Off at the location of the standard telephone, or can cause audio-amplifiers to be turned on at the standard telephone and then listen to determine if conditions are normal. In addition, it is also possible in special applications to dial and select slow-scanning television cameras for surveillance purposes, to operate document storage and retrieval apparatus, to accomplish remote retrieval of documents by facsimile, and the like.

What is claimed is:

1. An apparatus for converting a standard telephone to a private telephone when so desired without modification of the standard telephone, which comprises a sensor for incoming signals, a telephone receiver pick-up actuated on sensing of an incoming signal by said sensor, said actuation serving to prevent annunciation by said standard telephone, a pre-positioned switch, an annunciator, a stepping switch actuated by pulse signals received by said sensor, and means for actuating said annunciator when said stepping switch is actuated into electrical alignment with said pre-positioned switch by said pulse signals.

2. An apparatus as set forth in claim 1 in which said pre-set switch is a multi-position switch.

3. An apparatus as set forth in claim 2 which includes a time delay means to delay actuation of said annunicator during which delay receipt of additional pulse signals will dis-align said stepping switch and said manual switch.

4. An apparatus as set forth in claim 1 which includes means to de-actuate said receiver pick-up a predetermined time after actuation thereof.

5. An apparatus as set forth in claim 4 in which the stepping switch has an open circuited starting position and which includes means for resetting said stepping switch to said starting position before de-actuation of said receiver pick-up.

6. An apparatus which comprises a telephone, an inductive sensor for ringing and dialing signals received by said telephone; a handpiece pick-up for said telephone actuated on sensing of an incoming ringing signal by said sensor, said actuation serving to prevent continued ringing of said telephone; a power source, a manually positionable multi-position switch gang, a bell, a time delay relay and a stepping switch, said bell and time delay relay being connected in series to said power source through said multi-position switch and said stepping switch when said switches are aligned electrically by rotation of said stepping switch from a normal rest position to an aligned position, and a pulse discriminating relay adapted to receive dialing signals sensed by said sensor and to actuate said stepping switch in accordance therewith, whereby on receipt of an incoming call said pulse discriminator actuates said switch to said aligned position and said bell rings if said stepping switch has not been disaligned by the action of further dialing signals before said time delay relay operates.

7. An apparatus for use with a telephone to discriminate from all others and announce only incoming telephone calls identified by a proper pulse code which comprises means for preventing annunciation by said telephone, a pulse-operated switch normally biased to a rest condition and having an actuated condition, a pulse discriminator for incoming telephone signals adapted to actuate said switch from said rest condition to an actuated condition determined by a pulse code received, and an annunciator, whereby on receipt of an incoming call said pulse discriminator will actuate said pulse-operated switch to said actuated condition and said annunciator will announce said call if that incoming call is identified by an appropriate pulse code signal.

References Cited

UNITED STATES PATENTS

| | | | |
|---|---|---|---|
| 1,975,207 | 10/1934 | Getz et al. | 179—5.5 |
| 2,753,403 | 7/1956 | Caracciolo | 179—84 |
| 3,226,489 | 12/1965 | Grambsch | 179—84 |
| 3,376,390 | 4/1968 | Hashimoto | 179—6 |

KATHLEEN H. CLAFFY, Primary Examiner

W. A. HELVESTINE, Assistant Examiner